United States Patent [19]

Noll et al.

[11] Patent Number: 4,480,821
[45] Date of Patent: Nov. 6, 1984

[54] APPARATUS FOR PERFORMING A WORK FUNCTION ON A TUBULAR WORKPIECE

[75] Inventors: Hans Noll; Wilfried Bangert; Hans Hacobs, all of Leverkusen, Fed. Rep. of Germany

[73] Assignee: Klöckner-Werke AG, Duisburg, Fed. Rep. of Germany

[21] Appl. No.: 452,314

[22] Filed: Dec. 22, 1982

[30] Foreign Application Priority Data

Dec. 23, 1981 [DE] Fed. Rep. of Germany ....... 3150971
Mar. 6, 1982 [DE] Fed. Rep. of Germany ....... 3209439

[51] Int. Cl.³ .............................................. B23K 7/04
[52] U.S. Cl. ....................................... 266/54; 266/57; 266/73
[58] Field of Search .............................. 266/54, 57, 73

[56] References Cited

U.S. PATENT DOCUMENTS

| | | | |
|---|---|---|---|
| 4,148,467 | 4/1979 | Sargeant | 266/57 |
| 4,265,430 | 5/1981 | Eriksson et al. | 266/54 |
| 4,323,223 | 4/1982 | Noll | 266/54 |
| 4,349,182 | 9/1982 | Blackburn | 266/57 |
| 4,384,901 | 5/1983 | Swoboda | 266/54 |

Primary Examiner—W. Stallard
Attorney, Agent, or Firm—Watson, Cole, Grindle & Watson

[57] ABSTRACT

An apparatus for performing a work function on a tubular workpiece includes a support frame movable along an X-axis, a bracket on the frame movable toward and away from the workpiece along a Z-axis, a support arm mounted on the bracket for movement about a swivel axis lying in the Z-direction, a carriage mounted on the arm for movement therealong in a Y-direction, a workpiece implement mounted on the carriage for movement together therewith and about a tilting axis lying in the X-direction, and the workpiece implement being capable of adjustment along its central axis, the support arm lying in a plane containing the swivel axis and perpendicular to the tilting axis.

12 Claims, 5 Drawing Figures

Fig. 2
Fig. 3
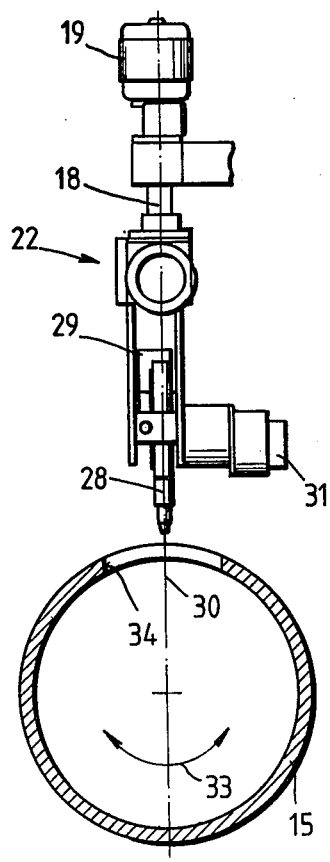
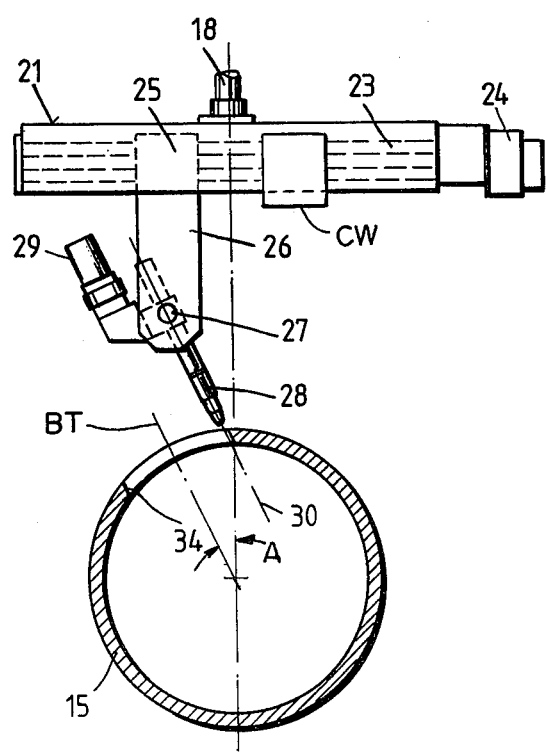

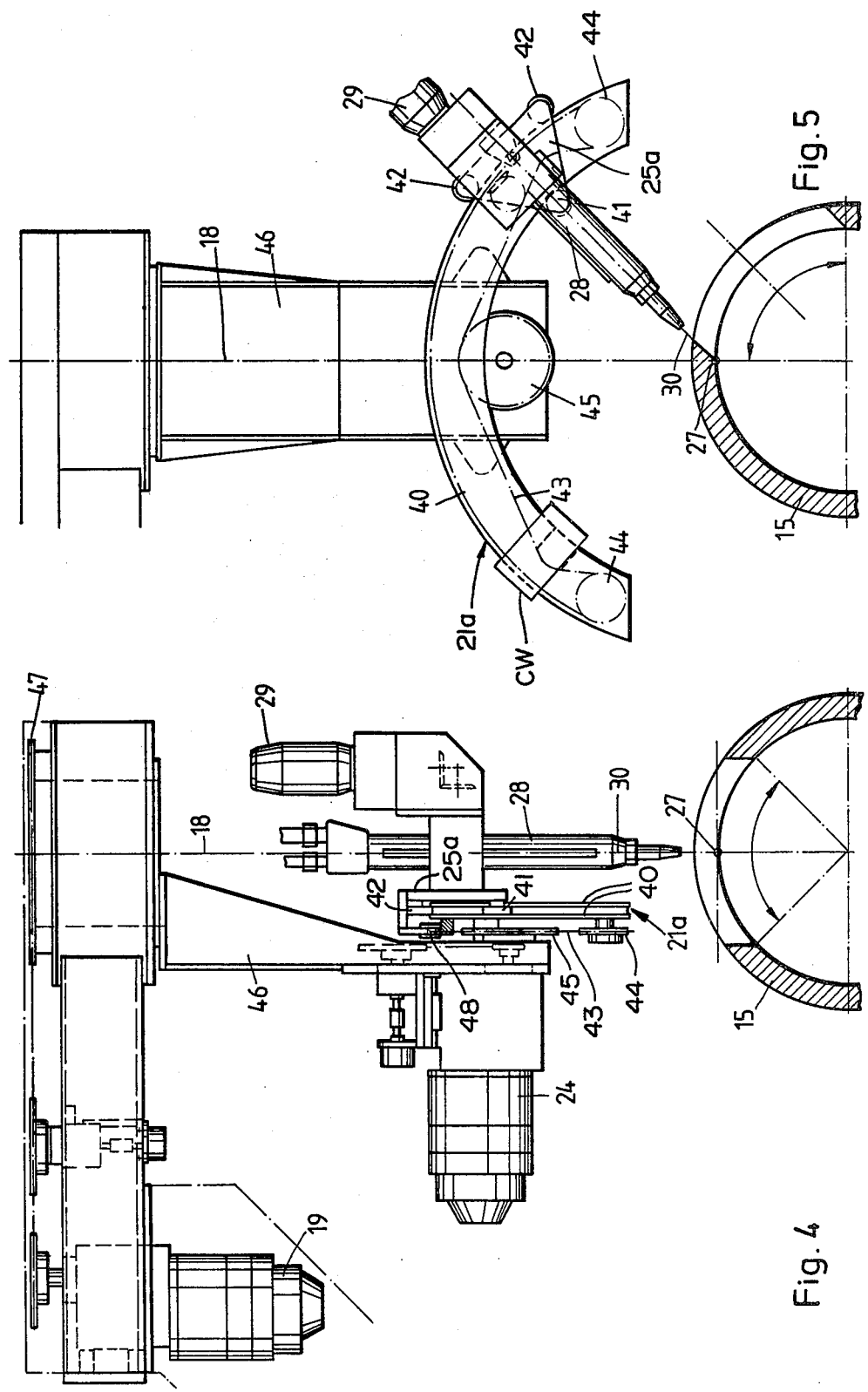

APPARATUS FOR PERFORMING A WORK FUNCTION ON A TUBULAR WORKPIECE

BACKGROUND OF THE INVENTION

This invention relates generally to an apparatus for the machining of a tubular workpiece, and more particularly to such an apparatus having a work implement, such as a metal cutting burner or a metal welding tool, capable of a wide variety of unobstructed movements relative to the workpiece.

The free end of the workpiece implement is capable of being longitudinally adjusteed along its central axis, the work implement is mounted on a support arm for movement therealong, the support arm is mounted on the apparatus for movement about a vertical swivel axis lying perpendicular to the support arm, and the work implement is capable of movement about a tilting axis lying at a right angle to the swivel axis.

A known apparatus of the general type aforedescribed is set forth in a publication entitled: "RB-Elektron 650/1200 AGD". The support arm of such apparatus is cantilevered horizontally from a support frame capable of being moved in a vertical direction and in a direction of the longitudinal axis of the tubular workpiece. The support arm is mounted on the frame for movement about a swivel axis which lies horizontally. Tilting movement of the burner is effected by parallelogram guiding. By swivelling the burner arm about its horizontal swivel axis and tilting the burner about the tilting axis of the burner arm, the burner is capable of being adjusted throughout almost 360°. Only angular areas of adjustment with approximately a horizontal burner position are excluded since such positions cannot be achieved, due to the geometry of the parallel guiding. In other words, from a central vertical position, the burner cannot be swivelled completely through ±90° therefrom. And, the central point of the angular adjustability of the burner is located by almost an angle of 360° on the intersection of the swivel and burner axes.

This known burner apparatus presents drawbacks in that the burner arm has too much play whih can only be corrected by additional and extensive mechanical arrangements. The parallelogram guiding system, necessarily includes a large number of joints which must be capable of movement without interference so that the tilting may be carried out with essentially the same ease independent of the initial tilting angle, and which must be adjusted in such a precise manner that, when the burner is swivelled through its vertical position, no dead angles occur. These requirements cannot be achieved in practice with the known burner arm arrangement. Instead, burner arm swivelling becomes unstable during repeated and extensive use and, in practice, it makes jerk-like movements since the tolerances of the swivel angles are too high. Thus, precise cutting requirements are not capable of being achieved.

SUMMARY OF THE INVENTION

The apparatus according to the invention is aimed at avoiding these disadvantages of the known burner arm arrangement, and improves upon the known apparatus in such a manner that the position of the burner is free from play and is always easily adjustable independently of the initial vertical position of the burner.

In accordance with one embodiment of the invention, the tilting axis is arranged on a sliding carriage which moves longitudinally along the work implement support arm, such movements being perpendicular to the swivel axis and to the tilting axis, and the support arm being mounted on the frame of the apparatus for movement about the swivel axis.

In accordance with one feature of the invention, the support arm is centrally mounted between its ends, and a counter-weight is provided on the arm corresponding in weight to the movable carriage and to the workpiece implement, the counter-weight being movable along the support arm in an opposite direction from that of the carriage and at a distance from the swivel axis equal to the distance of the carriage moves away from the swivel axis, so that the weight of the carriage and the workpiece implement is balanced when moved along the arm away from the swivel axis.

Another feature of the invention includes the balancing of the workpiece implement on the carriage about the tilting axis by the provision as a positioning drive for the implement projects away from the tilting axis in a direction opposite that of the implement.

In accordance with yet another features of the invention, the support arm is curved about the tilting axis which intersects with the swivel axis at the inner surface of the workpiece, the carriage being guided along the curved support arm and the workpiece implement being fixedly secured to the carriage and extending radially inwardly toward the tilting axis so as to avoid the need for a positioning drive otherwise required for the workpiece implement for adjusting the tilting angle thereof. And, with such arrangement, the distance changes between the tip of the implement and the tubular workpiece, for tubes having a radius of curvature other than that of the curved support arm, during movement of the implement along the curved arm.

Other objects, advantages and novel features of the invention will become move apparent from the following detailed description of the invention when taken in conjunction with the accompanying drawings.

BRIEF DESCRIPTION OF THE DRAWINGS

FIG. 2 is an end elevational view of the guide assembly of the FIG. 1 apparatus in a first position relative to a tubular workpiece shown in cross-section;

FIG. 3 is a side elevational view of the FIG. 2 guide assembly after having been rotated 90° therefrom shown relative to the tubular workpiece in cross-section;

FIG. 4 is an end elevational view of an apparatus having a guide assembly according to another embodiment of the invention, shown relative to the tubular workpiece in cross-section; and FIG. 5 is a side elevational view of the guide assembly of the FIG. 4 apparatus when rotated through 90°, shown relative to a tubular workpiece in cross-section.

DETAILED DESCRIPTION OF THE INVENTION

Figure 1:
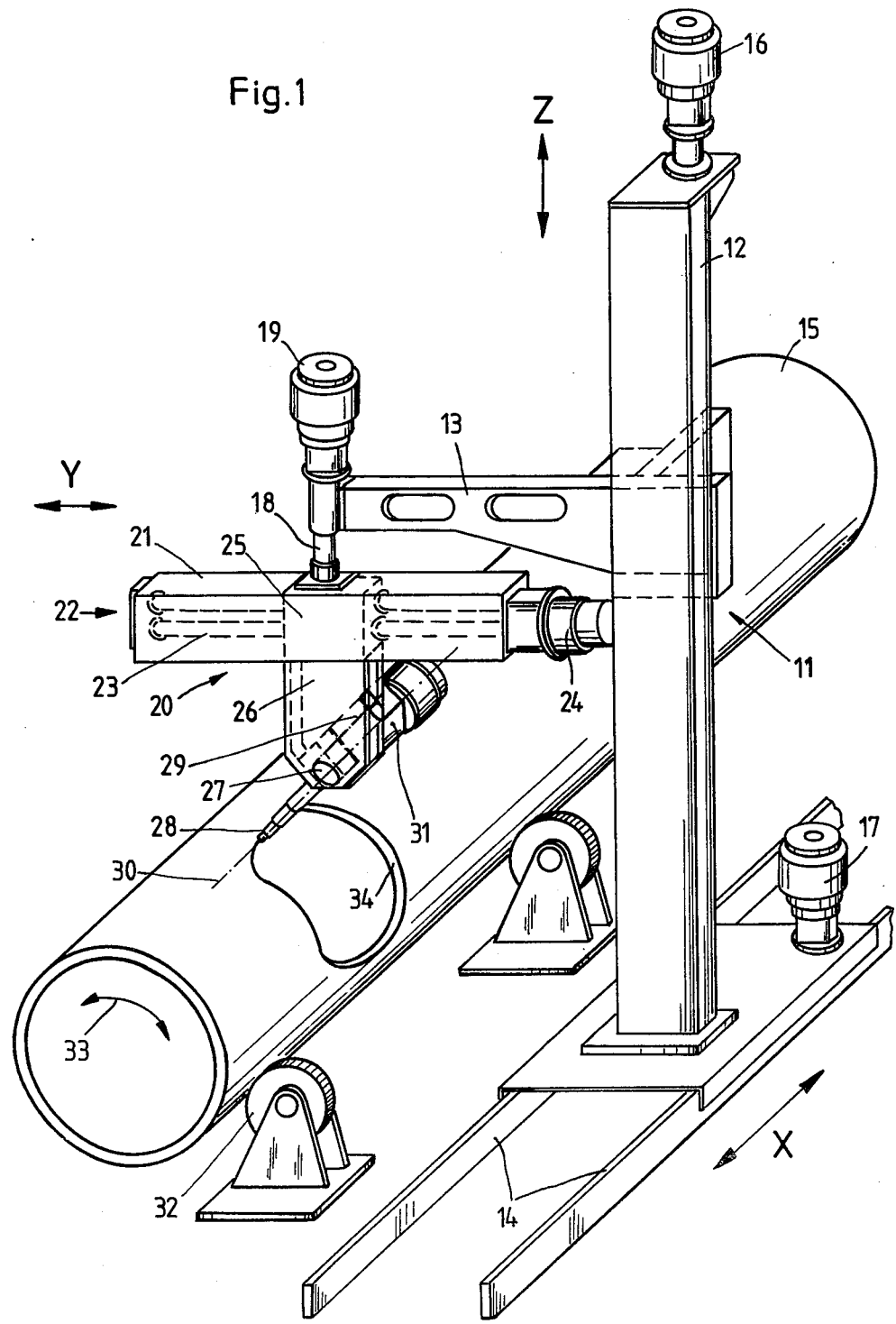
FIG. 1 is a perspective view of one embodiment of the apparatus according to the invention, having a unique guide assembly.

The apparatus shown in FIG. 1 represents a flame or torch cutting machine for a tubular workpiece. Only the essential structural elements are shown necessary for understanding the invention, the controls to be used for moving the various components of the apparatus, the gas supply for the burner, etc., being omitted for the sake of clarity. The apparatus comprises a support frame 11 which includes an upstanding guide port 12 and a horizontal bracket arm 13 which is cantilevered from the post for movement along suitable guide rails (not shown) thereon. Support post 12 is movable along a pair of guide rails 14 extending in an X-direction which lies parallel to the central longitudinal axis of a tubular workpiece 15 which, as will be seen, is to be cut or welded by a workpiece implement depending on whether a burner or welder is used. The bracket arm 13 is capable of being raised and lowered on post 12 along a Z-axis by means of an electric motor 16 mounted at the top of post 12 and being operatively connected with the bracket arm in some suitable manner to effect movement. A similar electric motor 17 is provided for moving post 12 along the X-axis, this motor being operatively interconnected with the post for this purpose in any suitable manner. Bracket arm 13 extends along a Y-axis which, together with the Z-axis, lies in a radial plane relative to workpiece 15. An axle defining a swivel axis 18 is mounted at the free end of the bracket arm and is capable of being swivelled about its vertical axis (Z-axis) by an electric motor 19 mounted on the bracket arm and operatively interconnected with the axle in any normal manner. The swivel axis lies along the Z-direction and is a component of a burner arm generally designated 20. The axle along which the swivel axis is defined is fixedly secured to an elongated support arm 21 centrally between opposite ends thereof, this arm comprising a part of a guide assembly 22. Thus, when axle 18 is rotated by motor 19 about its swivel axis, the support arm 21 is likewise rotated about that axis in a horizontal plane which lies perpendicular to the swivel axis. The support arm contains a pair of parallel guide rods 23, lying above one another, of which at least one rod comprises a screw. An electric motor 24 is operatively connected with this screw rod for rotating same about its axis to effect back and forth movement of a sliding carriage 25 which is threadedly engaged with the screw rod and which is guided along the other of rods 23. Carriage 25 has a pair of depending flanges 26, and an axle 27 is supported adjacent the free ends of the flanges to define a tilting axis lying along the X-direction and parallel to the longitudinal axis of the tube-A workpiece implement 28, shown as an elongated burner in the drawings, is mounted on tilting axle 27 (FIG. 3) for tilting movement about the axis thereof and extends outwardly away from axle 27. A positioning drive 29 mounted on the workpiece implement at the tilting axle extends in a direction opposite the implement for movement of the burner along its central longitudinal axis 30. And, and electric motor 31 is mounted on one of the flanges 26 in operative engagement with the tilting axle to effect a tilting movement of burner 28 and drive 29 about the tilting axis.

Tubular workpiece 15 rests on spaced pairs of opposing driven rollers 32 forming a cradle for the tube for effecting rotation thereof in the direction of double arrow 33 about its longitudinal axis lying in the X-direction. Any simple drive means may be provided for effecting such rotational movement of the tube. And, together with the longitudinal movement of the support frame by means of electric motor 17, all points located on the wall of tube 15 can be reached. However, it is also possible to eliminate the rotary drive of tube 15 and to refrain from moving tube 15 during the cutting operation. Thus, radial movement of the tube will be replaced by a combined movement of the level adjustment of bracket arm 13 by means of electric motor 16 and the movement of carriage 25 along the longitudinal support arm 21.

FIGS. 2 and 3 show the position of sliding carriage 25 and the angular position of burner 28 relative to tube 15 at angular positions of 0° or 180° (with the support arm lying parallel to the tube axis in FIG. 2) and of 90° or 270° (with the support arm lying transversely of the tube in FIG. 3). In FIGS. 1 to 3, an opening in the wall of tube 15 is shown after having been cut for the mounting of a radially extending branch tube (not shown) at the cut opening and extending 90° to the longitudinal tube axis. A necessary, approximately ellipse-shaped cutting line is either provided by means of a template or by a computer which controls the individual electric motors 16, 17, 24 and 31 as well as positioning drive 29.

In FIGS. 2 and 3, the burner positions are shown relative to tube 15 which is to be rotated in the direction of double arrow 33. Because of the combined movements of tube 15 by means of rollers 32 and movement of the support frame by means of electric motor 17, with axis 30 lying parallel to central axis BT defined for the branch tube, edge wall 34 of the cut opening lies parallel to axis BT and axis 30 always intersects with the swivel axis during the cutting operation.

The cut to produce edge 34 commences at a burner angle of 0° in the position shown in FIG. 2. The burner is vertically disposed with its axis 30 coaxial with the swivel axis. During the cutting of the first 90° along the cutting line to produce edge 34, i.e., with the transition to FIG. 3, tube 15 is increasingly rotated about its axis until it reaches the position shown in FIG. 3 after having been rotated through an angle A. Since burner 28 must lie parallel to axis BT of the branch tube to be mounted at the cut opening being developed initially without a welding phase, the burner must be tilted to the same angle A with the advancing cut proceeding from its vertical position of FIG. 2. In order to maintain the cutting point of burner 28 on the extension of the swivel axis, the sliding carriage, as shown in FIG. 3, must be moved to the left (or, with an angle of 270°, to the right) a sufficient distance from the swivel axis corresponding to the tangent of angle A multiplied by the distance from tilting axis 27 to the cutting point which lies at the inner surface of tube 15 and perpendicularly beneath the swivel axis. By a combined adjustment of the sliding carriage along longitudinal support arm 21, a tilting of the burner about axis 27 through angle A, and movement of the burner along its axis 30 by means of positioning drive 29, the position of the burner shown in FIG. 3 is reached which corresponds with the cutting position at 90°. At 270°, the burner and carriage are moved to the right of the swivel axis when viewing FIG. 3.

With regard to burner positioning, the operation is simplified when the cutting is effected while tube 15 is not moved about its longitudinal axis. Thus, when cutting is carried out without a welding phase, burner 28 need only be displaced along the cutting line to produce an edge 34 lying parallel to axis BT. Thus, radial movement of the burner relative to the tube is effected by carriage movement longitudinally along the support arm and by the level adjustment of bracket arm 13.

The apparatus as aforedescribed is most suitable for producing complicated cut geometries without a welding phase, as described above, as well as with a welding phase. To prepare for a welding phase triangular in cross-section, additional material of tube 15 must be removed along the cut as compared to that shown in FIGS. 2 and 3, with the cutting line maintained on the inner surface of tube 15. The cutting edge with welding phase runs at a smaller angle to the tangent at the inner surface of the wall as compared to that shown in FIGS. 2 and 3. However, to produce a constant angle for the cutting at the entire opening, the burner angulority must be adjusted during the cutting operation. The burner arm 20 arrangement according to the invention is therefore advantageous. With a cutting edge produced upon rotation of tube 15 about its axis, when the cutting angle for the welding phase is to be essentially constant along the cut opening, sliding carriage 25 is laterally shifted a predetermined amount which is independent of the intended position along the cutting line. In FIG. 3, for example, this is achieved by shifting carriage 25 to the right by several millimeters and pitching burner 28 in a correspondingly steeper manner.

The distance of tilting axis 27 from the outer surface of tube 15 should be as short as possible since the tangent shifting along support arm 21 then remains small so that the required length of the support arm may be minimized. Also, it should be pointed out that a welding unit may be mounted on the support arm in place of the burner to effect a welding operation in the same manner as the aforedescribed cutting operation.

An apparatus in accordance with another embodiment of the invention is shown in FIGS. 4 and 5 wherein the longitudinal guide assembly does not include a straight support arm 21 but a circular curved support arm 21a having a radius of curvature which point 27 at its center of curvature and defining the tilting axis at the inner surface of the tube, as shown. The tilting axis intersects the swivel axis. And, carriage 25a comprises a triangular plate movable along the curved support arm which extends over more than ±45° relative to the swivel axis. The carriage fixedly supports burner 28 which extends in a radial direction so that central axis 30 thereof intersects with the tilting axis. The burner is therefore not capable of being tilted as in the FIGS. 1 to 3 embodiment, but is capable of being adjusted longitudinally along its axis 30 by means of positioning drive 29. Motor 31 is therefore eliminated in this embodiment.

The curved support arm of FIGS. 4 and 5 has a pair of circular ring sectors 40 of the same curvature as arm 21a but slightly wider so that, when secured along opposite sides thereof, they define guide grooves for rollers 41 and 42 which are mounted for rotation at the corners of triangular carriage plate 25a. The drive of the sliding carriage is effected by means of an endless chain or cable 43 extended about guide rolls 44, mounted on one of the ring sectors, and about an upper curved guide track 48. The carriage plate is attached to the lower cable run, and the cable is moved by an engaged drive gear 45 mounted on a bracket 46.

Electric motor 24 is provided for operating drive gear 45 and is likewise mounted on bracket 46 which depends from a drum mounted for movement about swivel axis 18. This drum has a driven disc 47 mounted thereon, and electric motor 19 has a drive gear with an endless chain or belt extending about this gear as well as about disc 47 to effect rotation of the drum about the swivel axis. Bracket 46 is arranged eccentrically to axis 18 such that axis 30 of the burner may lie coaxial to the swivel axis as shown in FIG. 4.

Also, a counterweight arrangement is provided for each guide assembly embodiment to insure that the center of mass of the longitudinal guide assembly always remains on the swivel axis regardless of the distance the carriage is moved away therefrom, thereby avoiding the creation of torques which could interfere with the free movement of the guide assembly components. Thus, a counterweight CW may be mounted on another pair of guide rods, behind rods 23 shown in FIG. 3, one of such another pair being threaded oppositely to threaded rod 23, and the counterweight being threadedly engaged therewith. Such threaded rod is rotated about its axis by motor 24, and counterweight CW corresponds in weight to the carriage, work implement and drives 29, 31, and is movable along the support arm in an opposite direction to that of the carriage and at a distance from the swivel axis equal to the distance of the carriage from such axis.

A similar counterweight CW may be mounted on an upper run of cable 43 corresponds in weight to the carriage, the burner, and positioning drive 29, and is thereby likewise movable along support arm 21a in an opposite direction from that of the carriage and at a distance from the swivel axis equal to the distance of the carriage from such axis.

A similar counterweight CW may be mounted on an upper run of cable 43, corresponding in weight to the carraige, the burner, and positioning drive 29, and is thereby likewise movable along support arm 21a in an opposite direction from that of the carriage and at a distance from the swivel axis equal to the distance of the carriage from such axis.

Of course, other arrangements may be provided for moving the counterweights to achieve the purpose intended, without departing from the invention.

From the foregoing, it can be seen that an apparatus for performing a work function, such as burner cutting or welding, on a tubular workpiece has been devised in which each of the joints for effecting the various movements are respectively defined by a single axis so that adjustment can be carried out precisely and without any undue play. A parallelogram guide is effected by a combined longitudinal movement of the carriage along the support arm and the tilting axis since there is only one axis for the swivel movement and for the tilting movement, respectively. Jamming or movement interferences in specific angular positions are therefore avoided, and the driving force for the angular adjustment of the burner is thus independent of its initial angle. Overall, precision of the adjusted movement is improved and the burner point may be adjusted to thereby improve upon the cut geometry.

The vertically extending swivel axis along the Z-direction assures that the longitudinal movement along the support arm and the tilting movement of the burner will lie in a vertical plane so that a dead angle is avoided when the burner passes through the vertical. The support arm is extended from the bracket arm and lies perpendicular to the swivel axis so that its weight is supported by the bearings of the swivel axle and not by its rotary drive. A dead angle is thus avoided during swivel movements.

With the various degress of movement of the burner arm, the tilting axis may be shifted to lie adjacent one end thereof so that tubes of large diameters can be cut with only small angular differences to the tangential.

The support arm in each embodiment is suspended centrally between its opposite ends and is provided with a counterweight so that the center of mass of the guide assembly always remains on the swivel axis to thereby avoid torque loading. And, the center of mass for the tilting arrangement is located on the tilting axis in the first embodiment so as to avoid shifting weight movements on the longitudinal guide assembly when the burner is tilted.

The curved support arm provided in the second embodiment avoids the need of a drive means for adjusting the tilting angle of the burner. By moving the sliding carriage along the curved support arm, the tilting angle of the burner is adjusted at the same time, since the burner extends radially toward the center of curvature of the support arm. And, the tilting axis is located in front of the burner point at the inner surface of the tubular workpiece.

And, the curved support arm permits the burner to be moved along its central axis relative to the tubular workpiece during its movement along the support arm without actuating its positioning drive 29. In such manner, inaccuracies during the guide of the sliding carriage have less of an effect on the adjustment of the burner. And, the adjustment paths necessary for adjustment of the burner, are shorter overall during the cutting operation.

Since the support arm of the guide assembly is centrally suspended from the swivel axis, tilting the burner after having moved the carriage to either side of the swivel axis is possible for carrying out the work function without swivelling the support arm. Moreover, the support arm could be shorter, or curved, so that moving from a coaxial burner and swivel axis position, only a swivelling movement or a tilting movement can be effected in one direction.

The edge wall of the opening cut into the tube normally lies parallel to the swivel axis independently of the turning of the guide assembly about the swivel axis and movement of the sliding carriage along the support arm. The burner axis is always directed to the same point at the inner surface of the tubular workpiece. In such manner, the program for the control of the burner arm is simplified.

In order to avoid contact between the burner arm and the tubular workpiece during the swivel movement about the swivel axis, the lower edges of the support arm must be maintained above the highest point at the outer surface of tube. And, the tilting axis should always be located below the support arm.

However, the angular position of the burner relative to the swivel axis is then limited when the support arm of the guide assembly is rigidly connected to the swivel axle. Thus, the burner axis cannot be inclined by 90° relative to the swivel axis. However, this large relative angle can be achieved by providing a sufficiently long support arm to permit the burner to be guided toward one end with its axis 30 lying parallel to the guide axis and directed to a portion of the tube which lies above the burner axis.

Obviously, many other modifications and variations of the present invention are made possible in the light of the above teachings. It is therefore to be understood that within the scope of the appended claims the invention may be practiced otherwise than as specifically described.

What is claimed is:

1. An apparatus for performing a work function on a tubular workpiece, comprising a support frame movable along a first axis lying parallel to the central axis of the workpiece, bracket means mounted on said frame for movement toward and away from the workpiece along a second axis lying perpendicular to said first axis, an elongated support arm mounted on said bracket means for movement about a swivel axis lying parallel to said second axis, carriage means mounted on said arm for movement therealong, a workpiece implement mounted on said carriage means for movement together therewith and for movement about a tilting axis lying parallel to said first axis, said implement having a forward end capable of being moved along a central axis of said implement toward and away from said support arm, said arm lying in a plane containing said swivel axis and perpendicular to said tilting axis, whereby independent axes are provided about which said implement may be adjusted relative to the workpiece.

2. The apparatus according to claim 1, wherein said support frame is upstanding, said swivel axis extends vertically, and said support arm and said tilting axis lie in spaced horizontal planes.

3. The apparatus according to claim 2, wherein said tilting axis extends through said carriage means and said implement has a rearward end lying adjacent said tilting axis.

4. The appartus according to claim 1, wherein said support arm is centrally mounted in place between opposite ends thereof, counterweight means provided on said arm corresponding in weight to said carriage means and said implement, said counterweight means being movable along said arm in an opposite direction from that of said carriage means and at a distance from said swivel axis equal to the distance of said carriage means from said swivel axis, whereby the weight of said carriage means and said implement is balanced when moved along said arm away from said swivel axis.

5. The apparatus according to claim 3, wherein positioning drive means is mounted on said carriage means for movement about said tilting axis for tilting said implement thereabout, said drive means and said implement lying on opposite sides of said tilting axis for weight balance on said tilting axis.

6. The apparatus according to claim 5, wherein said positioning drive means is capable of tilting said implement ±90° from a downwardly extending position of said implement.

7. The apparatus according to claim 1, wherein said support arm is curved about said tilting axis, and a pair of similarly curved rings being mounted on said arm for guiding said carriage means during the movement along said arm.

8. The apparatus according to claim 3, wherein said implement is mounted on said support arm such that the control axis of said implement always lies in the same plane as said swivel axis during the movement of said implement along said support arm.

9. The apparatus according to claim 7, wherein said central axis of said implement always extends along a radial line from said tilting axis during movement of said implement along said curved support arm.

10. The apparatus according to claim 1, wherein said carriage means depends from said support arm, and said tilting axis lies beneath said support arm.

11. The apparatus according to claim 1, wherein said implement is movable about said swivel axis from a first position in which said central axis is coaxial with said swivel axis, to positions at least ±60° from said first position.

12. The apparatus according to claim 7, wherein said curved support arm lies eccentric to said swivel axis, and said implement lying in a plane containing said swivel axis.

* * * * *